United States Patent Office 2,772,270
Patented Nov. 27, 1956

2,772,270

14-HYDROXYMORPHINONE AND 8,14-DIHYDROXYDIHYDROMORPHINONE

Ulrich Weiss, Jamaica, N. Y., assignor to
M. J. Lewenstein, Kew Gardens, N. Y.

No Drawing. Application October 21, 1954,
Serial No. 463,807

10 Claims. (Cl. 260—285)

The present invention relates to two new ketones of the morphine series, namely 14-hydroxy-morphinone (I) and 8,14-dihydroxy-dihydromorphinone (II).

Both compounds can be obtained by treatment of 14-hydroxy-codeinone (III) with concentrated aqueous hydrobromic acid. The structural formulas of these Compounds I, II and III are as follows:

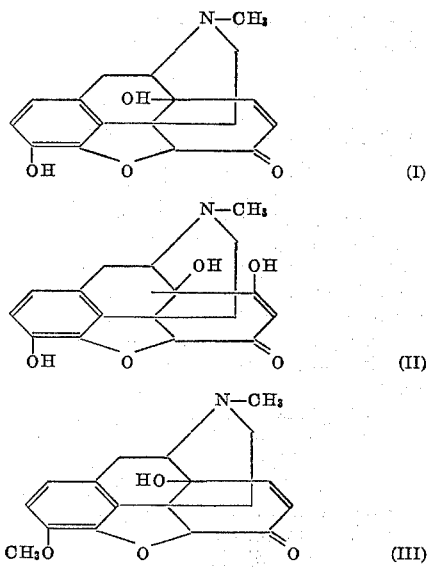

In the treatment of Compound III with concentrated aqueous hydrobromic acid usually mixtures of Compounds I and II are obtained, but formation of compound II is favored. Preparation of Compound I requires particular care and exact adherence to the method described.

The possibility of preparing the phenolic Compounds I and II by action of HBr on III was entirely unexpected. The structure of III is such that it did not seem probable that the compound would withstand the drastic conditions necessary for demethylation. Either the tertiary hydroxyl group at C14, or the alpha, beta-unsaturated ketone group, and much more so both together, might have been expected to lead easily to one of the aromatization-reactions with shift of the

—CH₂—CH₂—NCH₃— chain, which occur so frequently in the morphine series. In addition, III also contains the allyl-alcohol grouping

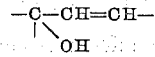

so that allylic shifts had to be anticipated, even if aromatization could be prevented.

Surprisingly, I have now found that said complications can be avoided and demethylation of III to I and II can be performed, provided the right conditions are chosen. Compound I is formed from III by rapid introduction of III into concentrated aqueous hydrobromic acid preheated to about 90°, the reaction time at 110–120° C. not to exceed 12 minutes. Furthermore, exposure during isolation, for any length of time, to higher temperatures or strongly acidic or alkaline conditions must be avoided.

Compound I, so prepared, appears in well shaped crystals which may be colorless or bright yellow, depending upon details of the isolation process. Recrystallization from ethanol seems to favor the yellow, from benzene and other non-polar solvents the colorless form.

Compound I is very little soluble in the common organic solvents. It decomposes at about 255° C. The elementary analysis is in excellent agreement with the formula $C_{17}H_{17}NO_4$.

The structure given above for I is supported by the following properties of the compound: pure blue color in aqueous suspension with ferric chloride, a reaction given by many morphine derivatives having a free phenolic hydroxyl group in position 3, and the oxygen bridge between C4 and C5 intact; strong yellow color of the solution in aqueous alkali, a reaction exhibited by all the known phenolic alpha-beta-unsaturated ketones of the morphine or codeine series; a carbonyl stretching band in the infrared spectrum, in the position typical of that of an alpha-beta-unsaturated ketone.

Final and conclusive proof for the correctness of Formula I is obtained through the action of diazomethane on I. From this reaction, 14-hydroxycodeinone III was obtained, and identified unequivocally by comparison with an authentic sample. This reaction demonstrates that I is indeed the product of simple demethylation of III and that none of the other possible alterations of the molecule have taken place.

Compound II is obtained by the action of concentrated HBr on III under a wider variety of conditions than is I. Apparently a certain amount of II is always formed, even under the conditions mentioned above as favoring the formation of I, but by various modifications of the procedure used, II can be obtained as the main product. Influences favoring its appearance are: more prolonged boiling with HBr or prolonged exposure, during isolation, to acidic or alkaline reaction.

Compound II always forms characteristic white needles. Inserted in a bath preheated to 200°, it decomposes with strong evolution of gas at about 220°, the actual temperature depending much upon the rate of heating. Compound II is much more soluble than I, especially in ethanol. It is also quite appreciably soluble in hot water, and can be conveniently purified by recrystallization from boiling water. Elementary analysis agrees well with the formula $C_{17}H_{19}NO_5$.

The Formula II given above is supported by the following reactions: In aqueous suspension II gives a beautiful blue color with ferric chloride; it dissolves in aqueous alkali without color, showing that it is not an alpha-beta-unsaturated ketone; in agreement with this, the carbonyl stretching band in the infrared spectrum is located in the position expected for a saturated ketone of this type.

Further support for Formula II is found in the observation that short heating of II with 20% HCl results in a modest yield of I, which was identified unequivocally.

EXAMPLE 1

*Preparation of 14-hydroxymorphinone*

100 ml. concentrated aqueous hydrobromic acid is heated to 90° C. in a round-bottom flask placed in a Glas-Col heater, equipped with a mechanical stirrer, thermometer and reflux condenser. 10 grams 14-hydroxycodeinone is rapidly added, and the temperature of the stirred mixture is brought to 110° C. as fast as possible. The base dissolves readily. The liquid is now kept at a temperature of 110–120° C. (not higher) for 12 minutes with continuous stirring. The solution turns more or less deep brown, and evolution of gas takes place.

To the reaction mixture 200 grams ice is added. A crystalline precipitate may form. Irrespective of this the mixture is neutralized by dropwise addition, with ice cooling of the outside of the flask and continued stirring, of a solution of 25 grams sodium hydroxide in 150 ml. water. The temperature during this step must not exceed about 15° C. The NaOH is added until the color of the liquid changes from light reddish to greenish brown. The crystalline precipitate, if present, changes to a more flocculent one.

To the cold liquid enough of the aqueous sodium hydroxide is added to give a final mixture which is tenthnormal in NaOH.

The liquid is next extracted without delay four times with chloroform, using 40-ml.-portions.

The aqueous phase is adjusted without delay to a pH of about 5 with dilute hydrochloric acid; the mixture is cooled during this operation. The acidic solution is treated with charcoal, filtered, and the light brown to brownish yellow filtrate is at once adjusted with ammonia to a pH of about 8. This solution is extracted eight times with 50 ml. portions of chloroform and the chloroform extracts are combined and dried with anhydrous sodium sulfate.

The dried chloroform extracts are evaporated to dryness in vacuo. The microcrystalline residue is rubbed with 10 ml. acetone and the mixture filtered with suction. The residue is washed on the filter with 10 ml. acetone and dried. It consists of I of rather good quality. It may be obtained pure by recrystallization from a large volume of boiling benzene or from boiling ethanol.

EXAMPLE 2

*Preparation of 8,14-dihydroxy-dihydromorphinone*

10 grams 14-hydroxycodeinone is introduced into 100 ml. concentrated aqueous hydrobromic acid. The stirred mixture is brought to boiling in a Glas-Col heater and kept refluxing vigorously for 25 minutes. It is next allowed to cool, and kept at room-temperature for about 5 days.

A solution of 40 grams sodium hydroxide in 70 ml. water is added in several small portions, preventing evolution of excessive heat by cooling in cold water.

The liquid is next extracted with four portions of 40 ml. chloroform each.

The aqueous phase is acidified to Congo paper with dilute hydrochloric acid, treated with charcoal, filtered and allowed to stand at room temperature for several days. The liquid is next adjusted to a pH of about 7–8, and seeded with 8,14-dihydroxy-dihydromorphinone. On standing for several days at room temperature, the base II crystallizes out in good yield. The crystals are filtered off and can be purified by dissolving in ethanol or acetone, charcoal treatment and addition of two volumes water to the filtrate. Alternatively it may be recrystallized from boiling water.

The novel Compounds I and II form salts with organic or inorganic acids, such as hydrochloric or sulfuric acid, for example by dissolving the base in an equivalent amount of aqueous acid and separating the salt by evaporation or precipitation of the solution. Salts of any other acid such as the bromide, iodide, phosphate, e. g. orthophosphate and metaphosphate, nitrite, nitrate, bitartrate, salicylate, terephthalate, acetate, propionate, phthalate, benzoate, camphosulfonate, citrate and others, can be prepared in a similar manner. The well-crystallized perchlorate salts of Compounds I and II are characterized by relatively low water-solubility.

The new compounds of the invention and their salts can be used an analgesics, if desired in mixture with other therapeutically active substances, such as antispasmodics and others.

It will be understood that while the above examples describe a best mode of carrying out the invention, the latter is not limited to these examples and can be carried out with various modifications. For example, KOH can be used instead of NaOH and $H_2SO_4$ of suitable concentration can be used instead of HCl. Demethylation can be performed also with other agents, such as HI, pyridine HCl and others. These and other modifications can be made without departing from the scope of the invention, as defined in the appended claims.

All temperatures stated are ° C.

Reference is made to my copending application, Serial No. 379,067, filed September 8, 1953, of which this is a continuation-in-part.

What is claimed is:

1. As a new compound, 14-hydroxymorphinone.
2. As a new compound, a salt of 14-hydroxymorphinone.
3. As a new compound, 14-hydroxymorphinone hydrochloride.
4. As a new compound, 8,14-dihydroxy-dihydromorphinone.
5. As a new compound, a salt of 8,14-dihydroxy-dihydromorphinone.
6. As a new compound, the hydrochloride of 8,14-dihydroxy-dihydromorphinone.
7. A process for preparing 14-hydroxymorphinone, comprising rapidly introducing 14-hydroxycodeinone into concentrated aqueous HBr preheated to about 90° C. and subjecting the reaction mixture to heating at 110°–120° C. for a short period of time; cooling the reacted solution; rendering the cooled solution alkaline and extracting it with chloroform; acidifying the aqueous solution, rendering it alkaline with ammonia and extracting the reaction product from the aqueous solution with chloroform.
8. A process for producing 8,14-dihydroxy-dihydromorphinone, comprising heating a mixture of 14-hydroxycodeinone with concentrated aqueous hydrobromic acid under vigorous refluxing; allowing the mixture to stand at room temperature for a protracted period of time; rendering the solution alkaline and extracting it with chloroform; acidifying the solution by the addition of acid and allowing it to stand at room temperature.
9. A process for producing 8,14-dihydroxy-dihydromorhpinone, comprising heating a mixture of 14-hydroxycodeinone with concentrated aqueous hydrobromic acid under vigorous refluxing; allowing the mixture to stand at room temperature for a protracted period of time; rendering the solution alkaline and extracting it with chloroform; acidifying the solution by the addition of acid and allowing it to stand at room temperature; bringing the filtrate to a pH of about 8 by the addition of ammonia and extracting the resulting liquid with chloroform.
10. A process for preparing 14-hydroxymorphinone and 8, 14-dihydroxdihydromorphinone, comprising heating 14-hydroxycodeinone with concentrated aqueous HBr up to boiling temperature; subsequently rendering it alkaline and extracting it with chloroform; acidifying the aqueous solution, rendering it alkaline with ammonia and extracting the resulting liquid with chloroform.

No references cited.